C. OEHRLEIN.
Combined Potato Digger and Hiller.
No. 211,476. Patented Jan. 21, 1879.
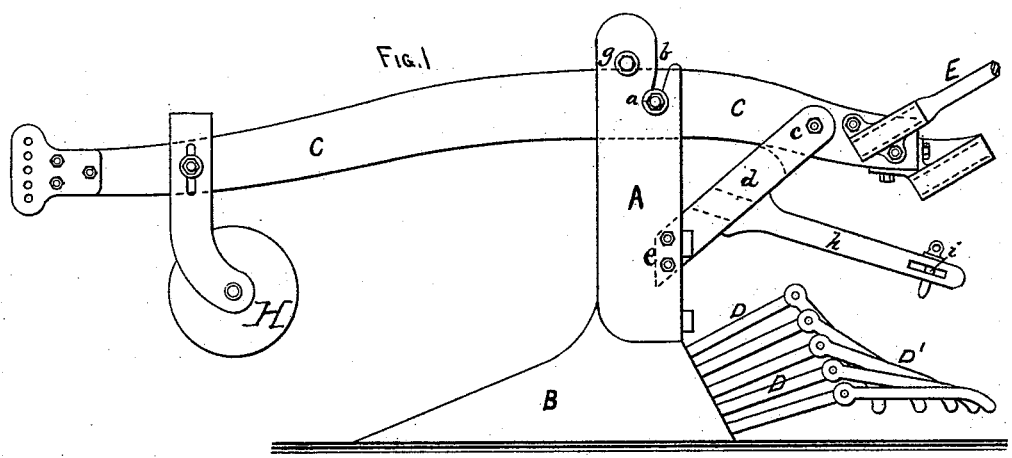
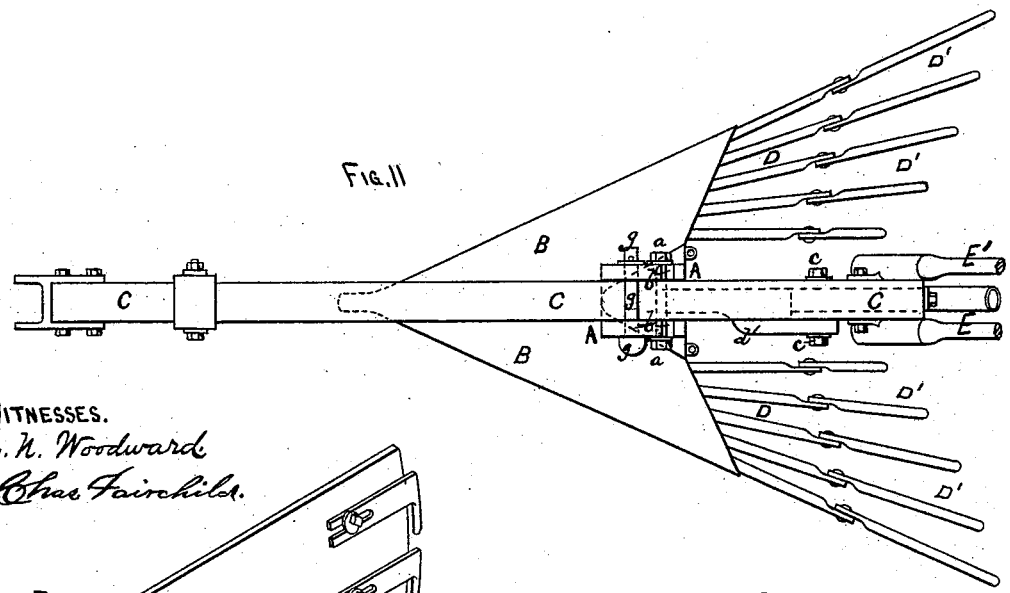
WITNESSES.
C. N. Woodward
Chas Fairchild
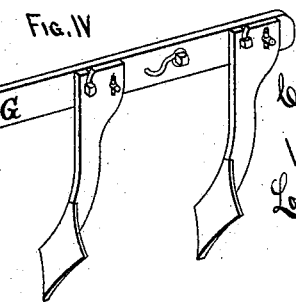
Casper Oehrlein,
INVENTOR, BY
Louis Feeser & Co.
Atty's.

UNITED STATES PATENT OFFICE.

CASPER ÖEHRLEIN, OF LITTLE CANADA, MINNESOTA.

IMPROVEMENT IN COMBINED POTATO DIGGER AND HILLER.

Specification forming part of Letters Patent No. 211,476, dated January 21, 1879; application filed May 25, 1878.

*To all whom it may concern:*

Be it known that I, CASPER ÖEHRLEIN, of Little Canada, in the county of Ramsey and State of Minnesota, have made certain new and useful Improvements in Combined Potato Digger, Hiller, Cultivator, &c., which improvement is fully set forth in the following specification and accompanying drawing, in which—

Figure 1 is a side elevation. Fig. 2 is a plan view; Figs. 3 and 4, detail perspective views of the hilling-wing or mold-board and cultivator detached.

This invention relates to machines for digging potatoes, &c.; and consists in the peculiar arrangement of the standard and beam in combination with the mold-board and fingers, as will be hereinafter and in detail explained.

My invention further consists in forming the mold-board with rigid fingers extended in the same planes with the mold-board, and combining therewith hinged drag-fingers, in the manner hereinafter more fully explained.

A is the standard; B, the mold-board and share, which is of the double-sided or shovel-plow pattern; and C, the beam. The beam rests in a slot in the top of the standard, in which it is held by a bolt, $a$. This bolt rests in slots $b\ b'$, which are made on the curve of which the bolt $c$ in the brace $d$, which connects the beam to the standard at $e$, is the center. By this means the beam is free to be lifted out of the slots $b\ b'$, while the standard will still be secured to it by the brace $d$.

$g$ is a wooden pin passing through the standard above the beam, and which will hold the latter in place under ordinary circumstances; but should the share meet with any extraordinary obstruction, the wooden pin will be broken, and the plow pulled over the obstruction, when a new pin must be placed in the standard, and the work proceeded with. By this means all danger of breaking the point of the share is avoided.

D D are a series of fingers or bars secured rigidly to the rear of the mold-board, and provided with hinged ends D', which are adapted to drag along the top of the ground and more thoroughly shake up the earth and loosen the potatoes from the soil. They may be set at any desired angle, or made of any desired length or form. It will be observed that the rigid fingers D have their top supporting-surfaces in planes which are the continuations of the mold-board, so that they form an open continuation of the same and greatly facilitate the loosening of the earth, while the hinged drag-fingers D' serve as rake-fingers to perfectly separate the potatoes from the earth.

To the rear end of the beam I attach three sockets, one on each side of the beam and one in the center.

The two side sockets are to receive the handles E E' when two handles are used, as in in digging potatoes; but when used as a cultivator or hiller only one handle is necessary, and then I remove both handles and insert one of them into the center socket. This renders the machine much more simple and convenient to handle.

Attached to the brace $d$ is another slanting brace, $h$, having a slot, $i$, through its rear end, into which the adjustable supporting-braces to the mold-boards or wings F and cultivator-bars G are secured, so that they may be adjusted and held at any required angle.

The arrangement of the beam, whereby the danger of breaking the share or standard is avoided, is an important feature of my invention, and is novel, so far as I am aware.

I am acquainted with several cultivators and seeding-machines in which a wooden pin adapted to break under extra strain and release the tooth is shown; but such I do not claim, broadly.

I am also aware that rigid fingers have heretofore been applied to the mold-boards of potato-diggers; but such I do not claim, broadly.

The mold-boards or wings, when the machine is used as a hiller, will be made almost straight at the end next the standard, while at the outer or rear end they will be made nearly semicircular, thus forming a gradually-increasing trough-like face, which rolls the earth out instead of pressing or forcing it out bodily.

When used as a hiller or cultivator, a rolling colter, H, will be used to assist the draft.

Having thus described my invention, what I claim as new, and desire to secure by Letters Patent, is—

1. The beam C, adapted to be secured to the standard A by means of bolt $a$, slots $b\ b'$, pin $g$, and brace $d$, in combination with the mold-board B, having the fingers D D', arranged and operated substantially as hereinbefore specified.

2. In combination with the mold-board B, formed with rigid fingers D, arranged to form continuations of the planes of the mold-board, the hinged drag-fingers D', hinged to the ends of the fingers D, and adapted to operate as and for the purpose hereinbefore set forth.

In testimony whereof I have hereunto set my hand in the presence of two subscribing witnesses.

CASPER OEHRLEIN.

Witnesses:
C. N. WOODWARD,
LOUIS FEESER.